Patented Mar. 22, 1932

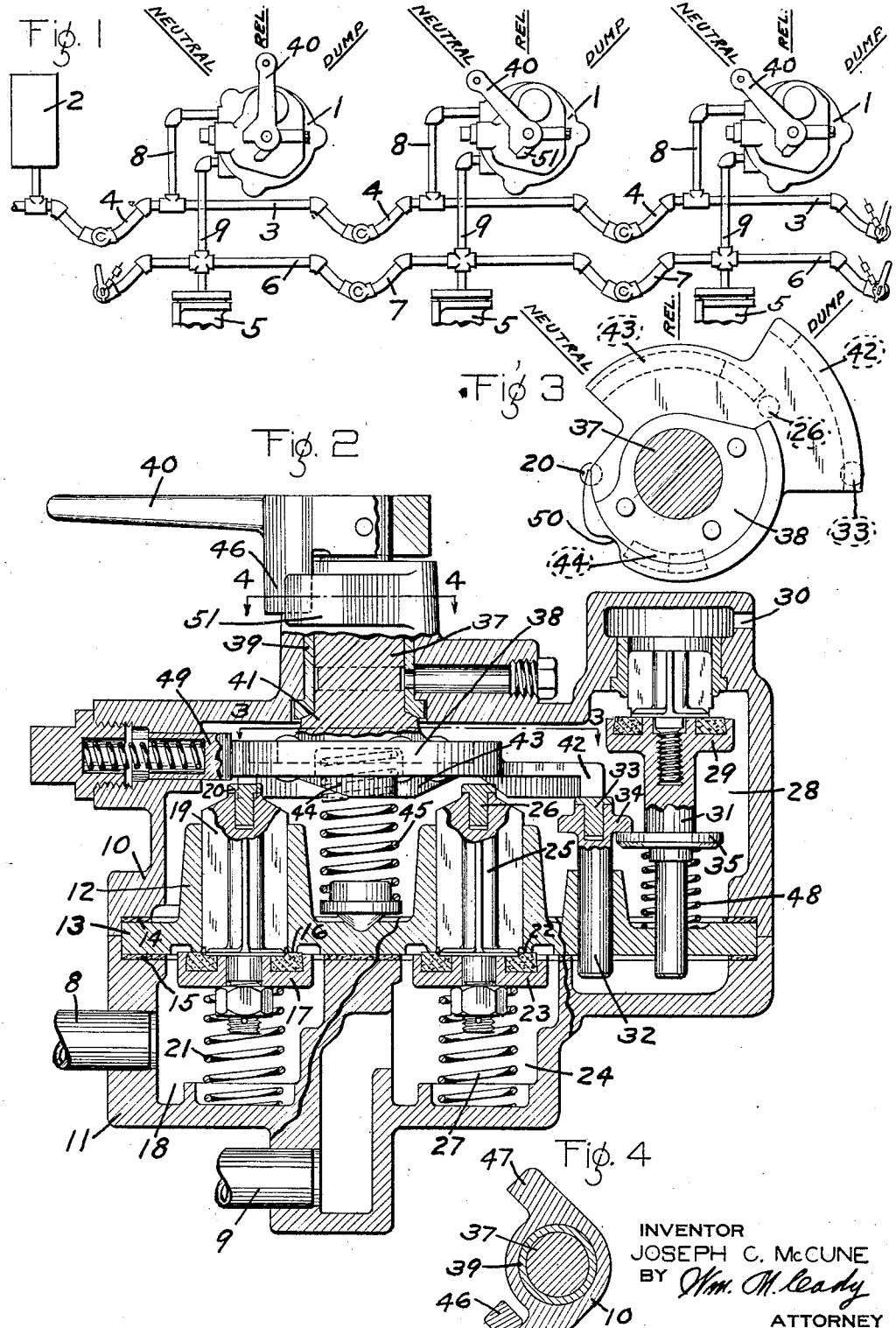

1,850,595

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

PNEUMATIC CAR DUMP CONTROL

Application filed December 27, 1929. Serial No. 416,956.

This invention relates to controlling valve devices, and more particularly to a valve device for controlling the dumping of cars.

The principal object of my invention is to provide a controlling valve device having a fluid pressure supply position, a release position, and a position in which leakage of fluid under pressure from the source of fluid pressure is prevented from leaking into the car dump operating line.

In the accompanying drawings; Fig. 1 is a diagrammatic view of a fluid pressure controlling apparatus as applied to a plurality of cars and embodying my invention; Fig. 2 a sectional view, broken in different planes, of the controlling valve device; Fig. 3 a section on the line 3—3 of Fig. 2; and Fig. 4 a section on the line 4—4 of Fig. 2.

As shown in Fig. 1, a controlling valve device 1 is applied to each car of the train and on the locomotive a reservoir 2, such as the usual main reservoir which is normally charged with fluid under pressure, is connected to a reservoir line 3, the reservoir line being connected between cars by the usual flexible hose connections 4.

Each dump car is equipped with an operating cylinder 5, the admission and release of fluid under pressure to and from which, operates to control the dumping of the car. The cylinder 5 on each car is connected to an operating line 6, which is connected between cars by flexible hose connections 7. The reservoir or fluid pressure supply line 3 is connected to the controlling valve device 1 on each car by pipe 8, while the operating line 6 is connected to the controlling valve device through pipe 9.

The controlling valve device 1 may comprise casing sections 10 and 11 and a valve carrying section 12, having a peripheral flange 13 which is clamped between the sections 10 and 11, with gaskets 14 and 15 interposed to make a leak tight joint.

The section 12 is provided with an annular seat rib 16 adapted to be engaged by a fluid pressure supply valve 17 contained in a valve chamber 18 provided in the casing section 11. The valve 17 is provided with a stem 19 which extends through a bore in the section 11 and is provided at its outer end with a cam engaging pin 20. The valve 17 is subject to the pressure of a coil spring 21, which urges the valve to its seat.

The casing section 12 is also provided with an annular seat rib 22, adapted to be engaged by a release valve 23 contained in a valve chamber 24 provided in the casing section 11. The valve 23 is provided with a stem 25 which extends through a bore in the casing section 12 and provided at its outer end with a cam engaging pin 26. The valve 23 is subject to the pressure of a coil spring 27, which urges the valve to its seat.

Mounted in a chamber 28 of the casing section 10 is an atmospheric exhaust valve 29, which controls communication from chamber 28 to an atmospheric exhaust port 30 and which is provided with a stem 31, the outer end of the stem being guided in a bore provided in the section 12. A pin 32 extends through a bore in the section 12 and is provided at its upper end with a cam engaging pin 33. Said pin has a flange 34 adapted to engage a collar 35 carried by the stem 31. A coil spring 48 acts on the collar 35 and through stem 31, urges the valve 29 to its seat.

Carried by an operating stem 37 is a cam plate 38, which is positioned in chamber 28. The stem 37 extends through a bore in the casing section 10 and operates in a bushing 39 and secured to the outer end of the stem 37 is an operating handle 40. A shoulder 41 on the stem 37 engages a seat on the bushing 39, so as to provide a leak tight joint, to prevent leakage of fluid under pressure from chamber 28 around the stem 37. The stem shoulder 41 is urged against its seat on the bushing 39 by a spring 45, acting through the cam plate 38.

The cam plate 38 is provided with a cam portion 42 adapted to engage the cam pin 33 in a certain rotative position of the cam plate, a cam portion 43 adapted to engage the cam pin 26, and a cam portion 44, adapted to engage the cam pin 20, in other positions of the cam plate.

If it is desired to operate the dump mechanism of the cars (not shown), one of the handles 40 is turned to the dump position, in which a depending lug 46 carried by the handle 40 engages a stop lug 47 carried by the casing section 10. In moving to this position, the cam portion 42 is rotated out of engagement with the cam pin 33, permitting the stem 31 to be moved by spring 48 so as to seat the valve 29. The cam portion 43 is also rotated into engagement with the cam pin 26, so that the valve 23 is unseated while the cam pin 33 is still in engagement with the cam portion 42. The cam portion 43, however, remains in engagement with the cam pin 26 after the cam portion 42 has been rotated out of engagement with the cam pin 33.

While the cam portion 43 is still in engagement with the cam pin 26, the cam portion 44 engages the cam pin 20, as the cam plate is rotated, so that the supply valve 17 is unseated. Fluid under pressure is then supplied from the reservoir line 3, through pipe 8 to valve chamber 18 and thence past the unseated valve 17 to chamber 28. From chamber 28, fluid flows past the unseated valve 23 to chamber 24 and thence to the operating line 6, so that fluid under pressure is supplied from the operating line 6 to all the dump cylinders 5 which may be connected to the operating line.

If it is desired to release fluid from the operating line 6 and the cylinders 5, the handle 40 is turned to release position, which position is determined by the engagement of a spring latch 49 in a notch 50 of the section 38. In moving to this position, the cam portion 44 is moved out of engagement with the cam pin 20, permitting the supply valve 17 to seat. The cam portion 42 is then moved into engagement with the cam pin 33, while the cam portion 43 is still in engagement with the cam pin 26. Fluid under pressure is then vented from the operating line 6 and the cylinders 5 through pipe 8, valve chamber 24, past the unseated valve 23 to chamber 28, and then past the unseated valve 29 to the atmospheric port 30.

In the neutral position, in which the handle 40 is normally maintained, the lug 46 engages a stop lug 51 on the casing section 10 and in this position, the cam portion 42 engages the cam pin 33, so that the valve 29 is held unseated, while the cam portions 43 and 44 are out of engagement with the cam pins 26 and 20 respectively, as shown in Fig. 3.

The valve 29 being unseated, any fluid leaking past the supply valve 17 will be vented at the exhaust port 30, so that possible building up of pressure in chamber 28 and leakage past the valve 23 to the operating line 6 is prevented.

While one illustrative embodiment of the invention has been described in detail, it is not my intention to limit its scope to that embodiment or otherwise than by the terms of the appended claims.

Having now described my invention, what I claim as new and desire to secure by Letters Patent is:

1. The combination with a fluid pressure supply pipe and an operating pipe, of a controlling valve device having a chamber and comprising a supply valve for controlling communication from said supply pipe to said chamber, a release valve for controlling communication from said chamber to said operating pipe, an exhaust valve for controlling communication from said chamber to the atmosphere, and manually operated means for opening the exhaust valve, while the supply valve and the release valve remain closed.

2. The combination with a fluid pressure supply pipe and an operating pipe, of a controlling valve device having a chamber and comprising a supply valve for controlling communication from said supply pipe to said chamber, a release valve for controlling communication from said chamber to said operating pipe, an exhaust valve for controlling communication from said chamber to the atmosphere, and manually operated means for opening the exhaust valve and the release valve while the supply valve remains closed.

3. The combination with a fluid pressure supply pipe and an operating pipe, of a controlling valve device having a chamber and comprising a supply valve for controlling communication from said supply pipe to said chamber, a release valve for controlling communication from said chamber to said operating pipe, an exhaust valve for controlling communication from said chamber to the atmosphere, and manually operated means for opening the supply valve and the release valve, while the exhaust valve remains closed.

4. The combination with a fluid pressure supply pipe and an operating pipe, of a controlling valve device having a chamber and comprising a supply valve for controlling communication from said supply pipe to said chamber, a release valve for controlling communication from said chamber to said operating pipe, an exhaust valve for controlling communication from said chamber to the atmosphere, and manually operated means for operating said valves, having one position in which the exhaust valve is open and the supply valve and the release valve are closed, another position in which the exhaust valve and the release valve are open and the supply valve is closed, and a third position in which the supply valve and the release valve are open, while the exhaust valve is closed.

In testimony whereof I have hereunto set my hand, this 23rd day of December, 1929.

JOSEPH C. McCUNE.